United States Patent [19]

Edge

[11] 4,369,109

[45] Jan. 18, 1983

[54] POOL SKIMMING NET

[76] Inventor: William F. Edge, 23 S. Ninth St., Quakertown, Pa. 18951

[21] Appl. No.: 223,275

[22] Filed: Jan. 8, 1981

[51] Int. Cl.³ .............................................. B01D 23/02
[52] U.S. Cl. .................................... 210/169; 210/238; 210/461; 210/462
[58] Field of Search ...................... 210/169, 242.1, 238, 210/461, 462, 486; 15/1.7; 403/108, 109, DIG. 4

[56] References Cited

U.S. PATENT DOCUMENTS

| | | | |
|---|---|---|---|
| 957,191 | 5/1910 | Dargin | 210/486 |
| 2,243,190 | 5/1941 | Capaldo | 403/109 X |
| 2,367,997 | 1/1945 | Chambers | 210/169 |
| 2,800,737 | 7/1957 | Crossan | 403/108 X |
| 2,878,941 | 3/1959 | Johnson | 210/486 X |
| 3,143,503 | 8/1964 | Schmidt et al. | 210/461 |
| 3,152,076 | 10/1964 | Kreutzer | 210/242.1 |
| 3,244,284 | 4/1966 | Shaffer | 210/242.1 |
| 3,625,364 | 12/1971 | La Chamie | 210/169 |
| 3,679,061 | 7/1972 | Davis | 210/486 |
| 3,795,933 | 3/1974 | Seufert | 403/108 X |
| 4,022,695 | 5/1977 | Howard et al. | 210/486 |
| 4,053,412 | 10/1977 | Stix | 210/169 |
| 4,085,763 | 4/1978 | Thomas | 403/109 X |
| 4,113,623 | 9/1978 | Koether et al. | 210/461 X |
| 4,206,000 | 6/1980 | Schuchardt et al. | 210/242.1 |
| 4,225,436 | 9/1980 | Csch | 210/169 |
| 4,247,216 | 1/1981 | Pansini | 403/109 |

Primary Examiner—Robert H. Spitzer
Attorney, Agent, or Firm—Harvey B. Jacobson

[57] ABSTRACT

A skimming net for cleaning floating debris from the surface of a pool includes the use of a frame attachable to a side portion of the pool and extending outwardly and into the liquid within the pool. A net is slidably positionable over the frame, while the frame may be tilted at a plurality of different angles so as to selectively position the net in a manner which allows a collection of debris as the liquid in the pool flows through the net. A quick disconnect assembly is provided for facilitating a removal of the frame and its net from the pool so that the debris may be removed from the net as desired.

7 Claims, 6 Drawing Figures

POOL SKIMMING NET

BACKGROUND OF THE INVENTION

1. Field of the Invention

The present invention relates to pool cleansing devices and more particularly pertains to a pool skimming device which utilizes a frame and net structure positionable in a pool in such a manner as to remove debris from the surface of the pool.

2. Description of the Prior Art

With respect to the development of various devices for cleansing pools, such as swimming pools or the like, there have been a number of such devices developed which have for their purpose the cleansing of debris off of the surface of a pool. This cleansing is desirable, of course, since the debris will eventually become waterlogged and sink to the bottom of the pool, thereby substantially increasing the difficulty of removing the debris from the pool. These pool skimming devices normally take two forms, i.e., those which must be manually operated by a user and those which are somewhat or completely automatic in their operation whereby only a minimal effort is required by a user to effect a cleansing operation.

With respect to the manually operable type of pool skimming device, reference is made to U.S. Pat. No. 3,863,237, issued to Doerr on Jan. 28, 1975, wherein there is disclosed a hand operated apparatus for removing stones, weeds, debris and the like from the bottom and surface of ponds and lakes. Effectively, the apparatus is no more than a net provided on the end of a handle whereby an operator may selectively extend the net into a pond to remove debris therefrom. As to the type of skimming device designed for less effort on the part of a user, reference is made to U.S. Pat. No. 3,625,364, issued to La Chance on Dec. 7, 1971, wherein a skimming device for swimming pools is disclosed. The skimming device consists of a pole and a rigid screening positioned over the pole, with one end of the pole being supported from an edge of the pool and the other end thereof extending outwardly from the edge so as to be positioned above and substantially parallel with the surface of the pool water. The screening is supported from the extending portion of the pole and extends downwardly into the water, and means for circulating the water are also envisioned so as to effect the movement of surface debris into contact with the screening. While the La Chance device is effective in skimming debris from the surface of a swimming pool, it can be appreciated that the device is difficult to manufacture in that the screening is of a rigid construction and includes upwardly extending lip portions for capturing the debris during a removal of the screening from a swimming pool. Further, the rigid screening is heavy and awkward to transport, while further being difficult and uneconomical to manufacture.

Accordingly, it can be appreciated that there is a continuing need for swimming pool skimming devices which may be easily and economically manufactured, and which are durable and lightweight in construction. In this connection, the present invention substantially fulfills this need.

SUMMARY OF THE INVENTION

The general purpose of the present invention, which will be described subsequently in greater detail, is to provide a pool skimming device that has all the advantages of similarly employed prior art pool skimming devices and has none of the above-described disadvantages. To attain this, the present invention provides a pool skimming device that utilizes a lightweight, plastic frame attachable to the side of a pool through the use of a quick disconnect mechanism and having a net slidably positionable thereover. Specifically, the skimming frame is constructed of lightweight plastic pipe and includes an extending arm positionable within a bracket attached to the side of the pool. The net utilized in the present invention is constructed in a bag form having one open end, such open end being positionable over an end portion of the frame so as to permit the net to be slidably positioned over the frame. The skimming device may then be lowered into the pool in a manner whereby a portion of the net is maintained above the surface of the pool, and the quick disconnect mechanism further includes a rotatable lock assembly whereby the frame and its net may be positioned at various angles with respect to the surface of the pool. As such, the normal circulation of the pool water will cause debris to float into the net so as to facilitate an easy removal thereof from the pool.

It is therefore an object of the present invention to provide a pool skimming device that has all the advantages of similarly employed prior art skimming devices and none of the disadvantages.

It is another object of the present invention to provide a pool skimming device which may be easily and economically manufactured.

It is a further object of the present invention to provide a pool skimming device which is lightweight and durable in construction.

Still another object of the present invention is to provide a pool skimming device which may be utilized to remove various insects and other debris floating on the surface of a pool before they become waterlogged and sink to the bottom of the pool.

Yet another object of the present invention is to provide a pool skimming device which utilizes a quick disconnect mechanism so as to facilitate a quick and easy removal of the same from a pool.

Even another object of the present invention is to keep pool water in a cleaner and more healthful condition, and to reduce the amount of time spent in vacuuming and cleaning a pool.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
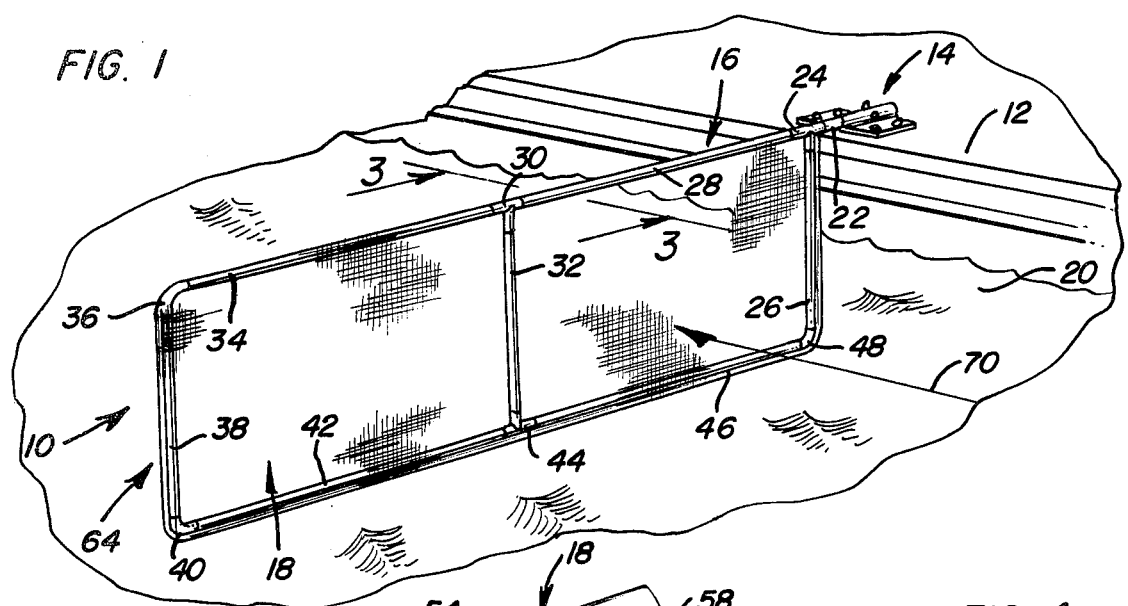
FIG. 1 is a perspective view of the pool skimming net forming the present invention operably positioned within a pool.

With reference now to the drawings and in particular to FIG. 1, there is shown a pool skimming net embodying the principles and concepts of the present invention and generally designated by the reference numeral 10. In this connection, it can be seen that the net 10 is operably attached to the outer top rim or side of a pool 12 through the use of a quick disconnect mechanism 14 and includes the use of a frame portion 16 having a net 18 slidably positioned thereon. Further illustrated in FIG. 1 is the fact that the pool skimming net 10 partially extends into a liquid 20, which most likely would be water, so that a portion of the net 18 extends above the surface of the liquid while a further portion of the net is below the surface thereof.

With respect to the frame portion 16 of the pool skimming net 10, it can be seen that the same is constructed from a plurality of tubular members, such as polyvinylchloride (PVC) plastic pipe or the like, and includes a support arm 22 which extends between the frame portion 16 and the quick disconnect mechanism 14. The support arm 22 is connected to a plastic Tee 24, while the Tee is further provided with a downwardly extending tubular member 26 and a first horizontally extending member 28. A free end of the horizontal tubular member 28 is fixedly secured to a second Tee member 30, and a second downwardly extending tubular member 32 is similarly connected to the Tee. A third horizontally extending tubular member 34 is fixedly secured to the Tee member 30 and a free end of the member 34 is then attached to a first elbow member 36. A third downwardly extending tubular member 38 is attached to the elbow 36, while a second elbow 40 is attached to a remaining free end of the member 38, so that a third horizontally extending tubular member 42 may be attached between the elbow 40 and a third Tee member 44. This third Tee member 44 is fixedly secured to a remaining free end of the downwardly extending member 32 while a fourth horizontally extending member 46 is attached to the Tee member 44 and a third elbow member 48, which is also fixedly secured to the first downwardly extending member 26. As such, it can be seen that the entire frame portion 16 of the present invention consists essentially of a support member 22; four horizontally extending tubular members 28, 34, 42, 46; three downwardly extending tubular members 26, 32, 38; three Tee members 24, 30, 44; and three elbow members 36, 40 and 48. Accordingly, it can be appreciated that the frame portion 16 may be quickly and easily manufactured from a minimum of parts.

Figure 2:
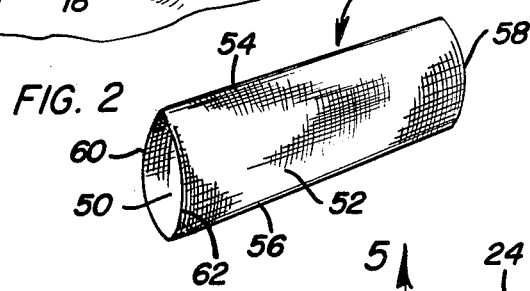
FIG. 2 is a perspective view of the net portion of the present invention which is slidably positionable over the frame.

FIG. 2 has been provided to specifically illustrate the structure of the net 18 which might typically be constructed of fiberglass and which is positionable over the frame portion 16 of the pool skimming net 10. Specifically, it can be seen that the net 18 includes a first rectangularly shaped net portion 50 and a second rectangularly shaped net portion 52 lying in a juxtaposed relationship to the first net portion. In this regard, the two net portions 50, 52 are joined together along a pair of longitudinal seams 54 and 56, as well as along one end seam 58. By the same token, the ends 60, 62 of the respective nets 50, 52 are not sewn or otherwise attached together so as to provide an opening into which an end portion 64 of the frame portion 16 may be inserted. In this connection, it can be appreciated that the net 18 is then formed in the shape of a sack having one open end, such open end permitting a sliding of the net over substantially the entire length of the frame portion 16 as illustrated in FIG. 1. This construction then presents a double layer of netting which is in contact with the surface of the liquid 20 contained within the pool 12. As such, the net 18 may be quickly and easily removed from the frame portion 16 in the event that it is desired to clean or replace the same.

Figure 3:
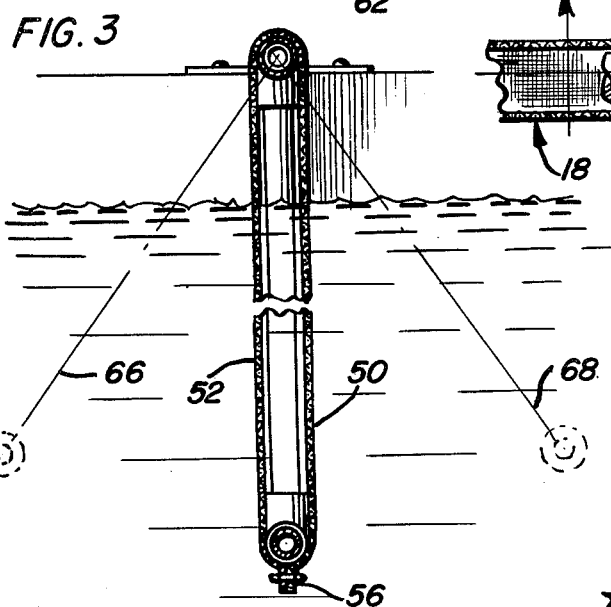
FIG. 3 is a transverse cross-sectional view of the present invention taken along the line 3—3 of FIG. 1 and illustrating the multiple positions to which the net may be adjusted.

FIG. 3 has been provided to illustrate the fact that the frame portion 16 may be fixedly secured within the liquid 20 at at least two different positions 66, 68. In this connection, and with reference to FIGS. 1 and 3 concurrently, it can be seen that the flow or circulation of liquid 20 might be in a direction 70 whereby it might be desirable to position the frame portion 16 in location 68 to better facilitate the collection of debris on the net 18. By the same token, should the flow of liquid 20 within the pool 12 be in a direction opposite that to arrow 70, the frame portion 16 might be rotated and fixedly secured in position 66. Also illustrated in FIG. 3 is the positioning of the net 18 over the frame portion 16 whereby one net portion 50 is illustrated as being on one side of the frame portion, while the other net portion 52 is illustrated as being on the other side thereof. Also, it can be seen that it may only be necessary to join the two net portions 50, 52 together along one horizontal seam 56 since for ease of manufacture, the seam 54 could be dispensed with by simply folding the net 18 in half along a longitudinal axis prior to a sewing or similar attaching thereof.

Figure 4:
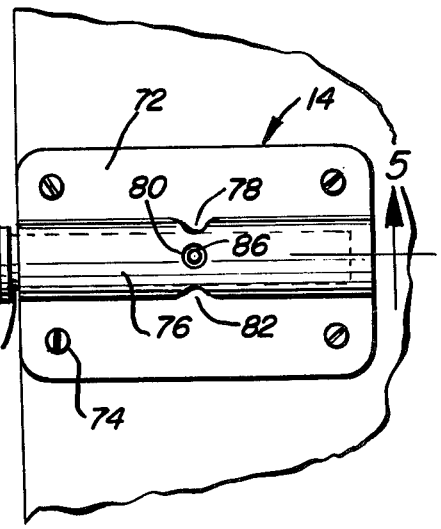
FIG. 4 is a top plan view, partly in section, illustrating the quick disconnect mechanism forming a part of the present invention.

FIG. 4 illustrates the quick disconnect mechanism 14 associated with the present invention. In this connection, it can be seen that the quick disconnect mechanism 14 includes a mounting plate member 72 which may be attached to the side of a pool through the use of conventional attachment means, such as screws 74 or the like, and which further includes an upwardly extending support arm or tube receiving portion 76 into which the support arm 22 of the present invention is positionable. In this regard, it can be seen that the upwardly extending tube receiving portion 76 of the disconnect mechanism 14 also includes at least three apertures 78, 80, 82 for facilitating the fixed positioning of the frame portion 16 in a vertical position within the liquid 20, or alternatively in one of the positions 66, 68 illustrated in FIG. 3.

Figure 5:
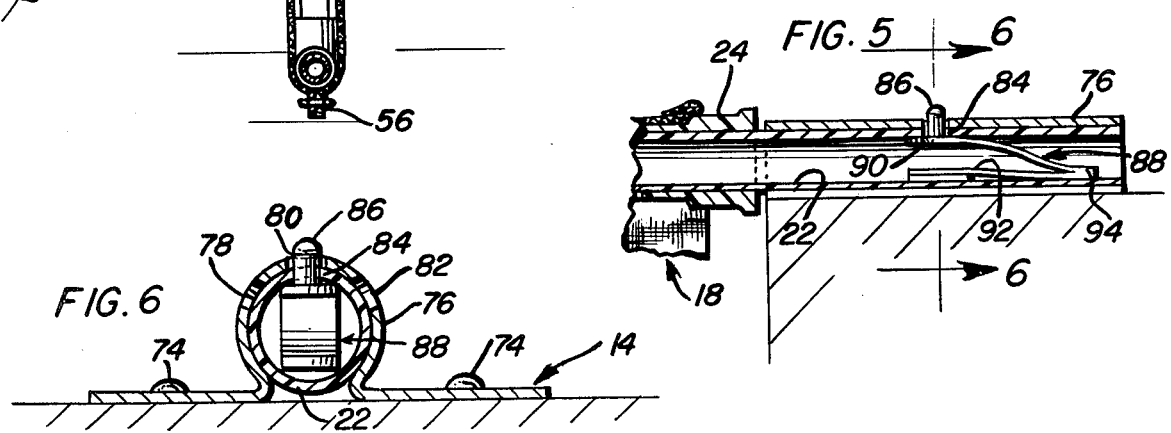
FIG. 5 is a longitudinal cross-sectional section of the quick disconnect mechanism illustrated in FIG. 4 and taken along the line 5—5 thereof.
Figure 6:
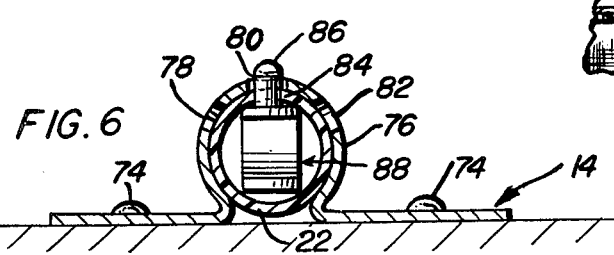
FIG. 6 is a transverse cross-sectional section of the quick disconnect mechanism of FIG. 5 and taken along the line 6—6 thereof.

To better understand the construction of the quick disconnect mechanism 14, reference is made to FIGS. 4–6 concurrently wherein it can be seen that the support arm 22 extends inside of the tube receiving portion 76 of the mechanism 14. Further, the support arm 22 is provided with an aperture 84 through which is selectively extensible a projection 86, such projection being integrally attached to a V-shaped spring biased lock member 88. In this regard, the lock member 88 consists of two arms 90, 92 fixedly secured together at one end 94 thereof and being constructed of a resilient material, such as plastic or the like. The lock member 88 is so constructed that the arms 90, 92 are naturally directed away from one another so that a biasing force is required to move them toward a common plane, thereby facilitating the retention of the projection 86 within the aperture 84, as well as one of the apertures 78, 80, 82 contained within the tube retaining portion 76. As such, it can be seen that a user of the present invention need only to utilize his finger to forcibly cause the projection 86 to move downwardly into the tube retaining portion 76 so that a manual rotation of the frame portion 16 can be effected. In other words, the projection 86 serves to effect a locking engagement between the support arm 22 with its attendant frame portion 16, and the quick disconnect mechanism 14.

In operation then, it can be appreciated that a user need only to first attach the disconnect mechanism 14 to the top outer rim or side of a pool 12 in the manner illustrated in FIG. 1, and then slidably position a net 18 over the frame portion 16 of the present invention. The frame portion 16 may then be connected to the quick disconnect mechanism 14 through an insertion of the support arm 22 within the tube retaining portion 76 thereof. Once the support arm 22 is completely inserted within the tube retaining portion 76, the projection 86 will snap upwardly into one of the apertures 78, 80, 82 associated with the disconnect mechanism 14 so as to retain the pool skimming net 10 in a desired position. If it is desired to change the angle of the net 10 within the liquid 20, it is only necessary for the user to utilize his finger to force the projection 86 downwardly into the support arm 22 thereby releasing the support arm 22 for rotation in or longitudinal removal from the mechanism 14.

With respect to the above description then, it should be realized that the optimum dimensional relationships for the parts of the invention are deemed readily apparent and obvious to one skilled in the art and all equivalent relationships to those illustrated in the drawings and described in the specification are intended to be encompassed by the present invention. In this connection, a typical construction of the present invention envisions the frame portion 16 being 5 to 6 feet long and 17 inches in depth or width. It could be constructed of ¾ inch pipe and fittings which would be cemented together using pipe cement. The frame portion 16 could then be slipped inside a fiberglass net enclosure 18 which would be approximately 68 inches long and 36 inches wide. The netting would of course be doubled or folded in half making it 18 inches wide, and would then be sewn along the long side and one end to form the sack which is positionable over the frame portion 16. In position, the net 10 would extend outwardly into the pool approximately 5 feet, while the net and its quick disconnect mechanism 14 should be placed 12 to 15 feet from the point where water is discharged into the pool. The lower part of the net 10 should extend below the surface of the water approximately 4 to 7 inches, depending of course upon the depth of the water within the pool. As the pool water circulates, bugs, flies and any and all other types of insects and foreign airborne matter or objects will be entrapped in the net 18. After a period of time, the net 10 is removed from the water and cleaned by using a soft brush or by washing with a water hose.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pool skimming apparatus, said apparatus comprising:
   net means for positioning in said pool to facilitate a skimming of floating debris from a surface portion of said pool, said net means being formed from two rectangularly-shaped portions of net juxtaposed one on top of the other and attached together along three edges thereof, said remaining edge of said net means being left open so as to form said net means into a sack-like structure having an open end;
   support means for supporting said net means in position within said pool, said support means including a rectangularly-shaped frame structure and a support arm extending therefrom, said rectangularly-shaped frame structure being formed from a plurality of longitudinally and vertically extending plastic tubular members fixedly secured together, said support arm similarly being formed from a plastic tubular member and being fixedly secured to said frame structure, said open end of said net means being positionable over a remote end of said frame structure so as to permit said net means to be slid over a substantial portion of said frame structure into a debris collecting position; and
   connection means attachable to an edge of said pool for receiving said support arm of said support means, said connection means including a mounting a plate member having a support arm receiving portion, said support arm receiving portion including at least two apertures, said support arm having a spring-biased projection extending therefrom, said projection being receivable into one of said at least two apertures contained in said support arm receiving portion so as to facilitate a lockable positioning of said support means within said pool, said at least two apertures in said support arm receiving portion being positioned to facilitate a rotatable angular positioning of said support means.

2. The pool skimming apparatus of claim 1 wherein said rectangularly-shaped frame structure includes a set of Tee members supporting intermediate tubular members and the pool skimming apparatus extends outwardly into the pool proximate from a discharge point where water is directed into the pool so that the normal circulation of the pool water from the discharge point passes generally through the pool skimming apparatus.

3. The pool skimming apparatus of claim 1 and wherein said rectangularly-shaped frame structure and said support arm extending therefrom are coupled by a Tee member and wherein the pool skimming apparatus includes release means so it is removed from the pool and cleaned by a brush or by washing with a water hose.

4. The pool skimming apparatus as defined in claim 1, wherein said connection means includes a quick disconnect mechanism so as to facilitate a movement of said support means within said pool.

5. The pool skimming apparatus as defined in claim 1, wherein said connection means utilizes said spring-biased projection positionable through one of said at least two apertures in said connection means so as to retain said support means in one of said fixed locked positions.

6. The pool skimming apparatus as defined in claim 1, wherein said open end is positionable over said frame structure and includes means so as to permit said net means to be slid over substantially an entire length of said frame structure thereby to facilitate the positioning of said net means within said pool.

7. A pool skimming apparatus, said apparatus comprising:
- net means for positioning in said pool to facilitate a skimming of floating debris from a surface portion of the pool, said net means being formed from two rectangularly-shaped portions of net juxtaposed one on top of the other and attached together along three edges thereof, said remaining edge of said net means being left open so as to form said net means into a sack-like structure having an open end;
- support means for supporting said net means in position within said pool, said support means including a rectangularly-shaped frame structure and a support arm extending therefrom, said rectangularly-shaped frame structure and said support arm forming a plurality of longitudinally and vertically fixed extending plastic members, said open end of said net means being positionable over a remote end of said frame structure so as to permit said net means to be slid over a substantial portion of said frame structure into a debris collecting position; and
- connection means attachable to an edge of said pool for receiving said support arm of said support means, said connection means including a mounting plate member having a support arm receiving portion, said support arm having a spring-biased projection extending therefrom, said projection being receivable into one of said at least two apertures contained in said support arm receiving portion so as to facilitate a lockable positioning of the support means within the pool, said at least two apertures in said support arm receiving portion being positioned to facilitate a rotatable angular positioning of said support means.

* * * * *